Figure 1:
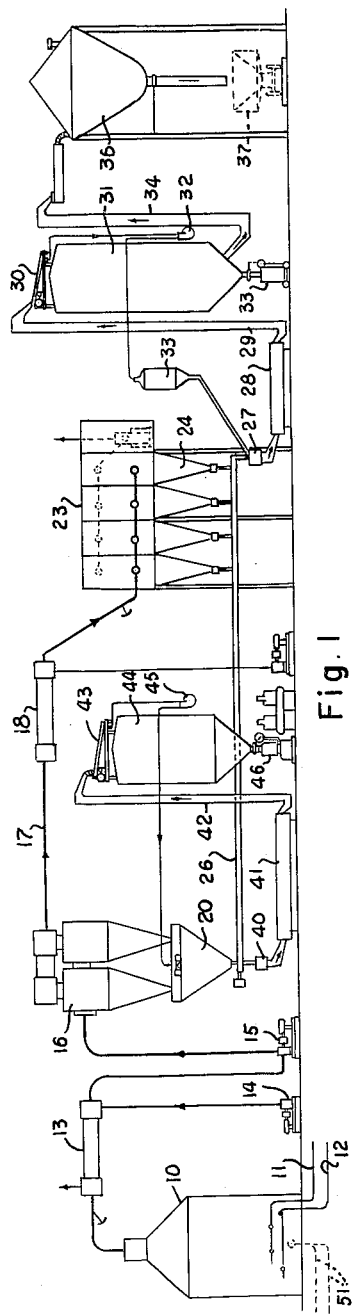

July 11, 1961   W. H. BALKA ET AL   2,992,074
CARBON BLACK PROCESS AND APPARATUS
Filed Oct. 16, 1957   3 Sheets-Sheet 1

INVENTORS
William H. Balka
Rice P. Lynn

BY *Hastings Ackley*

ATTORNEY

July 11, 1961  W. H. BALKA ET AL  2,992,074
CARBON BLACK PROCESS AND APPARATUS
Filed Oct. 16, 1957  3 Sheets-Sheet 2

INVENTORS
William H. Balka
Rice P. Lynn
BY Hastings Ackley
ATTORNEY

July 11, 1961 W. H. BALKA ET AL 2,992,074
CARBON BLACK PROCESS AND APPARATUS
Filed Oct. 16, 1957 3 Sheets-Sheet 3

INVENTORS
William H. Balka
Rice P. Lynn

BY *E. Hastings Ackley*

ATTORNEY

United States Patent Office 2,992,074
Patented July 11, 1961

2,992,074
CARBON BLACK PROCESS AND APPARATUS
William H. Balka, Dallas, and Rice P. Lynn, San Angelo, Tex., assignors to Lynn Carbon Black Company, Inc., San Angelo, Tex., a corporation of Delaware
Filed Oct. 16, 1957, Ser. No. 690,467
9 Claims. (Cl. 23—209.6)

This invention relates to the manufacture of carbon blacks and more particularly to a means and a method for manufacturing carbon blacks.

One object of the invention is to provide a new and improved method for manufacturing carbon blacks from gaseous or liquid hydrocarbons, such as natural gas or oil, or combinations of gaseous and liquid hydrocarbons, the term "carbon blacks" including the various types of carbon known as "chemical carbon," "colloidal carbon," "carbon black," and any other type of carbon.

Another object is to provide a method for manufacturing carbon blacks which includes partly decomposing the hydrocarbons in a lower primary dissociation zone and a thermal cracking zone above the primary dissociation zone, and varying the turbulence and velocity of the gases in an upper dissociation zone where the hydrocarbons are subjected to a contact catalyst and further cracked to vary the type and increase the amount of carbon blacks produced.

Still another object is to provide a new and improved method for manufacturing carbon blacks wherein a contact catalyst means is employed in the dissociation zone to increase the rapidity of production of the carbon black in the upper dissociation zone.

Another object is to provide a new and improved means for manufacturing carbon blacks which includes a furnace provided with a burner for the gaseous hydrocarbons, means for introducing air into the furnace, and a vertically movable means located above the burner for varying the volume of the furnace.

Still another object is to provide a carbon black manufacturing means having a substantially cone shaped contact catalyst member or hood vertically movable over the burner for varying the volume of the furnace.

A further object is to provide a carbon black manufacturing means, wherein the contact catalyst member of hood may be adjusted in position vertically to vary the turbulence and velocity of the gases in the upper dissociation zone of the furnace.

A still further object is to provide a carbon black manufacturing means wherein the hood functions as a contact catalyst to augment the production of the carbon blacks from the hydrocarbons.

A further object is to provide a carbon black manufacturing means wherein gaseous hydrocarbons, oil or natural gas, are introduced into the burner and liquid hydrocarbons such as oil, are introduced into the furnace in atomized form above the gas burner.

Still another object is to provide a new and improved burner for a carbon black manufacturing furnace.

A further object is to provide a burner having a substantially semi-cylindrical upper section provided with a plurality of spaced ports, a substantially semi-cylindrical lower section, and conduit means extending into the burner through the lower section for introducing combustible gases into the burner.

A still further object is to provide a burner, of the type described above, wherein the upper section has a greater radius of curvature than the lower section to provide a large surface and thus a great number of ports and to decrease the velocity of flow of the gases in the interior of the burner.

Another object is to provide a burner wherein the ports are flared outwardly, the radius of the flare being substantially less than the length of the port.

Figure 7:
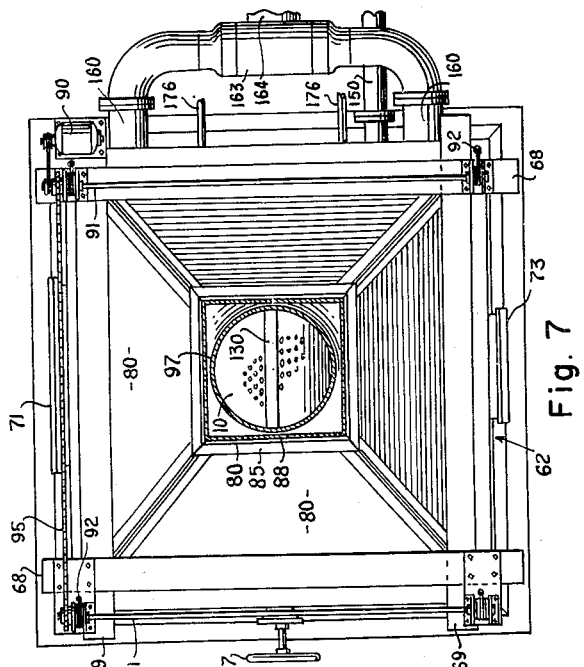
Figure 6:
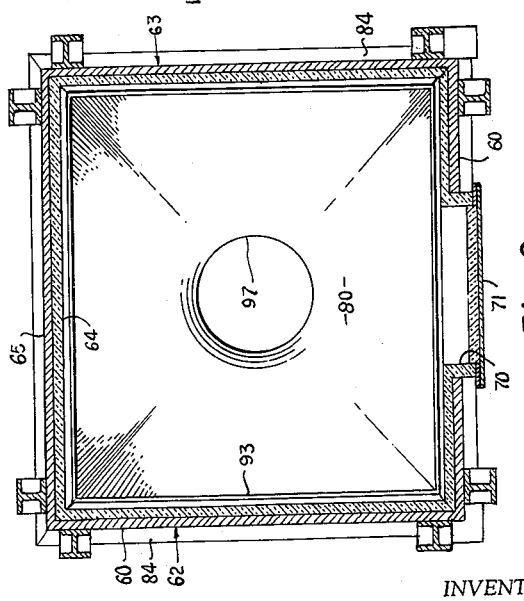
Figure 2:
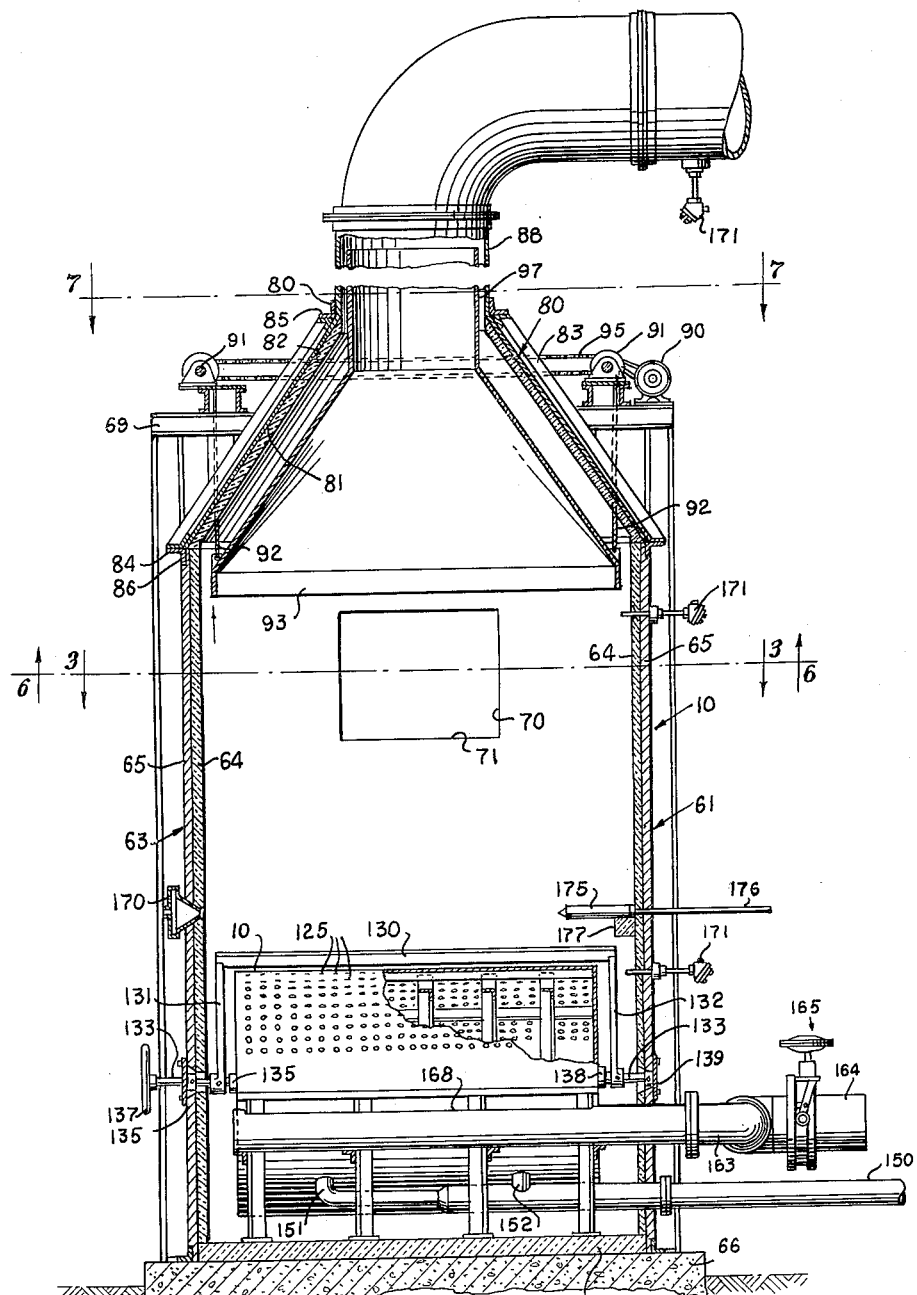
Figure 5:
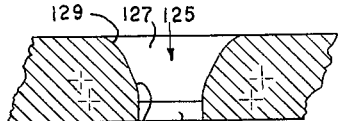
Figure 3:
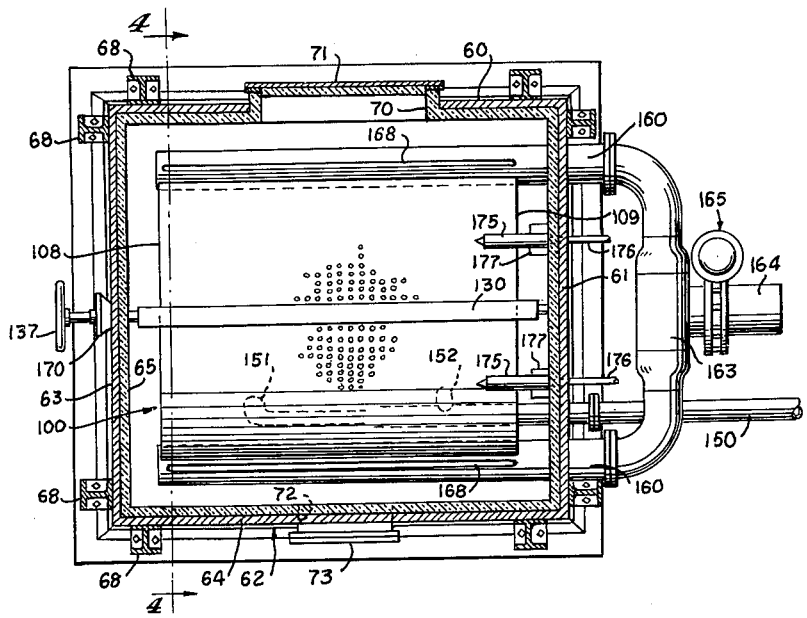
Figure 4:
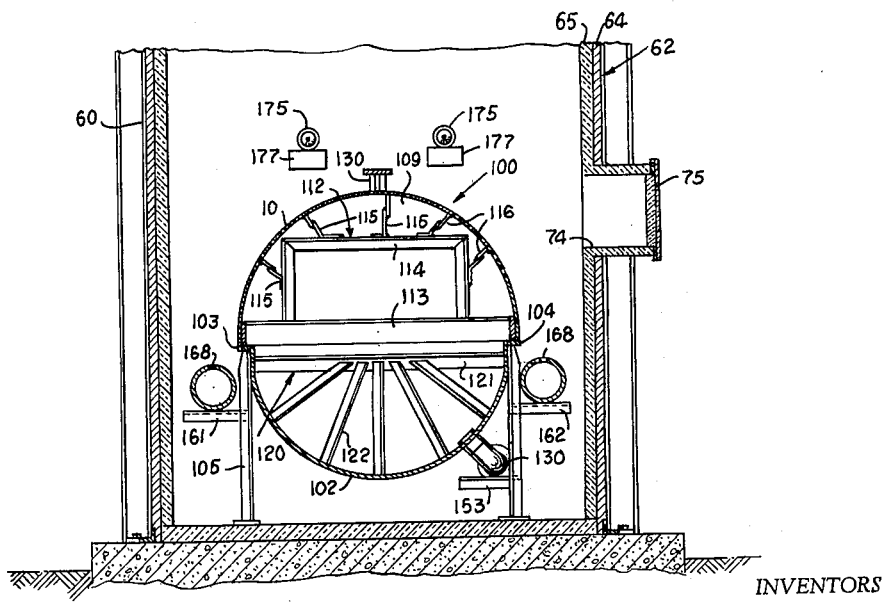

Additional objects and advantages of the invention will be readily apparent from the reading of the following description of a device constructed in accordance with the invention, and reference to the accompanying drawings thereof, wherein:

FIGURE 1 is a schematic flow chart of a carbon black manufacturing system employing the furnace embodying the invention;
FIGURE 2 is a vertical sectional view of the furnace;
FIGURE 3 is a sectional view taken on line 3—3 of FIGURE 2;
FIGURE 4 is a sectional view taken on line 4—4 of FIGURE 3;
FIGURE 5 is an enlarged fragmentary sectional view showing a flared port of the burner.
FIGURE 6 is a sectional view taken on the line 6—6 of FIGURE 2; and
FIGURE 7 is a view partly in elevation and partly in section taken on the line 7—7 of FIGURE 2.

Referring now particularly to FIGURE 1 of the drawings, the carbon black manufacturing system there schematically illustrated includes a furnace 10, into which air and gaseous hydrocarbons are introduced through the air and gas lines 11 and 12, respectively. The volume of air supplied to the furnace is insufficient to support complete combustion of the hydrocarbon whereby carbon black is formed in the furnace in a manner to be described below, and carried therefrom suspended in the hot gases resulting from the partial combustion to a primary cooler 13 of any suitable construction, supplied with cooling air by a fan 14. The mixture of carbon black and gases is cooled in the primary cooler and then moved by the fan 15 through suitable ducts to cyclones 16 of any suitable construction wherein the carbon black laden gases are caused to travel downwardly in a circular or helical path and then upwardly to a duct 17 to a secondary cooler 18. During the movement of the gases in the downward helical path, a large portion of the carbon black suspended in the gases is separated therefrom by centrifugal forces and collected in a bin 20.

The remaining carbon black not separated from the gases in the cyclones 16 is carried along by the gases through the secondary cooler 18 where the gases are further cooled by air supplied thereto by the cooling fan 22. The cold gases are then conducted to a dust tube collector 23 wherein the remaining carbon black is separated from the gases and collected in the bin 24, the gases now free of carbon black being exhausted to the atmosphere.

The carbon black collected in the bins 20 and 24 may be conveyed by a screw conveyer 26 to a pulverizer 27 where it is pulverized and then to a pelletizer 28 where the pulverized carbon black is compacted into pellets which are transported by a suitable means, such as a bucket conveyer 29, to a sizing shaker screen 30 which permits pellets of a predetermined size to fall into a storage bin 31, the rejected pellets, broken pellet fragments and carbon dust being moved by a blower 32 back to the puverizer 27. The pellets may be dispensed from the storage bin to a tote bin 33 through a suitable dispensing duct or, in the alternative, may be moved by a bucket elevator 34 and belt conveyer 35 to a bin 36 for discharge therefrom into gondolas 37 or other railroad cars.

The carbon black stored in the bin 20 may be sent directly to its own pulverizer 40 instead of to screw conveyer by any suitable valve means, not shown. The carbon black so pulverized is transported to a pelletizer 41 where it is compacted into pellets which are moved by a bucket elevator 42 to a shaker screen 43. The shaker screen 43 permits pellets of a predetermined size to pass into a storage bin 44 while rejected pellets, broken pellets and carbon dust are moved back to the pulverizer 40 by a blower 45. The carbon black from the storage bin 44 may be dispensed into bagging machine 46 which packs predetermined amounts of the carbon black into individual bags.

The various elevators, conveyers, blowers, pulverizers and pelletizers are operated at adjustable speeds by suitable prime members so that the above carbon black manufacturing system is of the continuous flow type.

It will thus be seen that the carbon black manufacturing system converts hydrocarbons, either gaseous or liquid, into carbon black in a furnace 10 and that hot gases produced in the furnace which carry the carbon black move to a cooler 13, then through cyclones which remove a large portion of the carbon black from the gases, to another cooler 18 and then to a dust tube collector where the remainder of the carbon black is recovered from the gases discharged from the furnace. It will also be seen that the carbon black may be removed and used in the form of fluffy black or may be pelletized prior to being transported to the point of use.

The furnace 10 is preferably of rectangular form having four vertical side walls 60, 61, 62 and 63 formed of outer metal sections 64 and inner sections 65 of refractory material, such as fire bricks. The side walls are positioned on a concrete base 66 on which a layer 67 of refractory material, such as fire bricks, is laid. The walls are held in place by vertical I beams 68 bolted at their lower ends to the concrete base 66 and secured together at their top ends by cross members 69. The side 60 is provided with an explosion opening 70 closed by an explosion door 71 held in place by a suitable means which permits the door to open when an excessive pressure develops in the furnace.

The side 62 is provided with an access opening 72 closed by a door 73 and with a manhole 74 closed by a cover 75. A substantially conical top 80 rests on and is secured to the upper ends of the vertical sides of the furnace and is formed of an inner section 81 formed of a refractory substance and an outer metal section 82. The furnace top 80 is provided with vertical bracing members 83 and upper and lower longitudinal bracing members 84 and 85. The lower horizontal bracing members are rigidly secured, as by bolts, to similar bracing members 86 of the furnace sides while the upper bracing members have rigidly secured thereto, as by bolts, similar bracing members 87 of a duct 88 which is thus secured to the furnace top 80 to conduct the products of the furnace to the primary cooler.

A prime mover 90, such as an electric motor, and winches 91 are mounted on the cross members 69, the winches being provided with steel cables 92 which extend through suitable apertures in the furnace top to support a contact catalyst member or hood in the furnace. The winches are interconnected by a chain 95 so that rotation of the prime mover 90 in one direction will unwind the steel cables 92 off the winches 91 and thus lower the hood in the furnace while rotation of the prime mover 90 in the opposite direction will wind the steel cables on the winches and thus raise the hood in the furnace.

The hood 93 is of substantially conical form and is provided at its upper end with a cylindrical extension 97 which telescopes into the duct 88 of the furnace top.

A burner 100 is mounted on the floor 67 of the furnace. The burner includes an upper semi-cylindrical section 101 of metal and a lower semi-cylindrical section 102. The upper section has a larger radius of curvature than the lower section so that a pair of parallel longitudinally extending horizontal bars 103 and 104 may be disposed between the spaced side edges of the two sections and welded thereto to form downwardly facing shoulders. The burner is supported on a plurality of legs 105 and 106 whose upper ends abut and are secured, as by welding, to the bars 103 and 104, respectively. The ends of the substantially cylindrical member formed by the two semi-cylindrical sections are closed by end plates 108 and 109 secured thereto in any suitable manner, as by welding.

The upper section 101 is provided with a plurality of longitudinally spaced bracing frames 112, each of which includes a horizontal cross member 113 whose opposite ends rest upon and are secured, as by welding, to the bars 103 and 104. An inverted substantially U shaped member 114 in turn is secured by welding to each cross member 113. Straps 115 welded to the U-shaped member extend outwardly to abut inwardly extending straps welded to the semi-cylindrical upper section 101, the abutting straps being welded whereby the upper section is braced by the bracing frames.

The lower semi-cylindrical frame is also braced by a plurality of longitudinally spaced bracing frames 120 each of which includes a horizontal member 121, which may be L shaped, welded at its opposite ends to the lower section and a plurality of angular members 122 which extend divergently from the middle portion of the horizontal member 121 to the lower section 102 and are welded thereto.

It will be apparent that the upper and lower bracing frames 112 and 120 impart great strength and rigidity to the burner.

The upper section 101 is provided with a plurality of apertures or ports 125 spaced over substantially the whole surface of the upper section except that no ports are provided along the longitudinal side edge arc portions of the upper section extending upwardly 5 degrees from the edges thereof. Each of the ports has a straight bore portion 126 whose diameter is preferably eight-tenths the thickness of the plates forming the upper section and whose length is two-tenths the thickness. The upper flared portion 127 of each bore preferably has a radius of curvature which is six-tenths the thickness of the plate. The curvature of the bore flare being taken about two vertically and laterally spaced annular center lines 128 and 129. The provision of ports whose dimensions are so related to the thickness of the upper section provide a most advantageous mantle of flame above the burner.

A scraper blade 130 is mounted on the burner by means of legs 131 and 132 whose outer ends are welded to the scraper blade and whose lower ends are provided with bores through which extend shafts 113 and 114, respectively, the legs being rigidly secured to the shafts in any suitable manner, as by set screws. The shaft 113 is journaled in bearings 135 and 136 mounted on the end plates 108 of the burner and on the outer section 65 of the side wall 63 of the furnace, the shaft extending outwardly through the side wall 63 and being provided with a hand wheel 137. The shaft 134 is journaled in bearings 138 and 139 mounted on the end plate 109 of the burner and on the outer section 65 of the side wall 61 of the furnace. It will now be apparent that the scraper blade may be moved through an arc of 180 degrees about the upper section 101 of the burner to scrape or clean off any carbon black which may be deposited on the outer surface thereof which might tend to clog or obstruct the ports 125.

Gas is introduced into the interior of the burner 100 by a conduit 150 which extends into the furnace through a suitable aperture in the side wall 61 thereof and is provided with two branches 151 and 152 which extend through the lower burner section 102 and open into the interior of the burner adjacent the lower portion thereof so that the gas first flows into the lower section of the burner and is preheated as it moves into the upper section thereof. The gas then moves outwardly of the burner through the ports 125 of the upper burner section 101. The conduit 150 is supported on extensions 153 of the legs 106.

Air is admitted into the furnace on each side of the burner 100 and below the side edges of the upper burner section by a pair of conduits 160 which extend inwardly into the furnace through suitable apertures in the side wall 61 and are supported by the extensions 161 and 162 of the legs 105 and 106, respectively. The outer ends of the air conduits 160 are connected to an air supply conduit 163 by a connecting conduit 164. The supply conduit 163 is provided with an air weight transmitter 165 which controls the rate of flow air and compensates for variations in atmospheric temperature and pressure to maintain the rate of flow constant.

The air conduits 160 are provided with elongate slots 168 which extend substantially the length of the burner so that a sheet of air flows upwardly therefrom on each side of the burner to the ports 125 whereby a mantle of flame is created when a hydrocarbon gas simultaneously is introduced into the interior of the burner.

The furnace 10 is provided with peep holes 170 and thermocouples 171 at various points so that the internal condition of the furnace may be observed and measured while the burner is in operation. It will be understood that each thermocouple generates a voltage which varies in accordance with the temperature of the furnace at the point at which the thermocouple is located and that a suitable meter, not shown, is connected to the thermocouple to measure the voltage and so indicate the temperature.

Liquid hydrocarbons, such as oil, may be introduced into the furnace through spray heads or nozzles 175 supplied with oil by inlet conduits 176 which extend inwardly through the side wall 62 of the furnace. The spray heads are supported on pillars 177 which may be formed of structural steel (not shown) insulated by a refractory substance, such as fire brick. The oil is atomized in being expelled through the spray heads by either steam pressure or mechanical pressure in the well known manner.

The oil, gas and air conduits are of course provided with valves, not shown, by means of which the rates of flow of these substances into the furnace are controlled.

In use when carbon black is to be produced from gaseous hydrocarbons, such as natural gas, the furnace is first pre-heated to a temperature ranging from 1800 degrees F. to 2400 degrees F. preferably by introducing natural gas into the furnace through the gas conduit branches 151 and 152 and air through the air conduits 160 at a rate sufficient to provide for the complete combustion of the gas.

When the desired temperature is attained, the ratio of air to gas is set, by means of suitable valves, at a predetermined value to produce the desired type of carbon black. Usually the ratio of air to gas is between 4 to 1 to 8 to 1, which is not sufficient to permit complete combustion of the gas.

The gas entering into the lower section of the burner is preheated therein as it moves upwardly toward the ports 125 of the upper section. The combustion air supplied into the furnace through the slots 168 of the air conduits 160 may be preheated or not depending upon the quality and kind of carbon black to be produced and upon the temperature and decomposition velocities required. The combustion air is of course preheated to some extent while moving through the conduits 160 in the furnace before escaping through the slots 168.

The air from the slots 168 rises slowly to the lower ports 125 on each side of the burner and to the primary combustion zone which extends from the lowest ports to a level just above the burner, ignition of the gas escaping through the ports occurring first at the lower burner ports and forming a mantle of flame about the upper burner section.

The furnace is operated at a slightly subatmospheric pressure due to the action of the blower 15, so that the non-oxygen bearing gases which leave the combustion zone move slightly toward the center of the furnace and vertically toward the midpoint of the furnace through a primary dissociation zone to a thermal cracking dissociation zone and thence upwardly into contact with the contact catalyst member or hood. In all of the dissociation zones, the primary dissociation zone, the thermal cracking zone and the contact catalytic cracking zone, the other carbons present in the gases, are dissociated or decomposed into carbon and hydrogen compounds as well as some decomposition into carbon black. In this thermal cracking zone, where the temperature ranges from 2200 degrees F. to 2600 degrees F., the hydrocarbons present in the gases are subjected to a thermal cracking procedure which brings about an exothermic reaction and increases the temperature present in the zone. The expansion of the gases, aided by the conical shape of the hood, causes a swirling turbulence of the gases which begins in the thermal cracking zone and which mixes the gases thoroughly and uniformly as they move upwardly toward the upper dissociation zone adjacent the contact catalyst member or hood. The gases moving from the thermal cracking zone upwardly through the upper portion of the dissociation zone have a mass velocity of turbulent flow of from 0.5 to 6 feet per second, the maximum velocity occurring in the upper portion of the hood just below the cylindrical extension 91 thereof. The highest temperatures, from 2600 degrees F. to 3,000 degrees F., are attained in this upper contact catalytic cracking zone in the upper portion of the hood where the remaining undecomposed gases are substantially decomposed by the catalytic contact cracking into carbon black and the products of combustion, whose amounts vary in accordance with the amounts of oxygen-bearing gases or air introduced into the furnace. The turbulence occurring in the upper portions of the furnace and within the hood 93 causes substantially all the gases to come into intimate contact with the walls of the hood or contact catalyst member which acts as a contact catalyst to facilitate producion or formation of carbon black from the hot gases.

The quality and kind of carbon black produced in the furnace depends upon various factors such as the types of hydrocarbons introduced into the furnace, the relative volumes or quantities of air and hydrocarbons introduced into the furnace per unit of time, and the vertically adjusted position of the hood or contact catalyst member in the furnace.

If the hood is lowered to its lowermost position over the burner, the two streams or sheets of air flowing from the slots 168 in the air conduits 160 are caused to curve inwardly and upwardly over the burner whereby most of the oxygen in the introduced air becomes immediately available to support combustion of the gas and whereby substantially all of the oxygen is immediately consumed adjacent the burner. The turbulence just above the burner is held to a minimum, since the hood is relatively close to the burner and air flows relatively smoothly in the swirling upward movement through the hood to the exhaust duct. As a result, most of the dissociation occurs as a thermal cracking process, and the carbon black produced is in the form of fine particles.

If the hood is raised to an upper position, the two streams or sheets of air from the air ducts tend to rise more nearly straight up in the furnace, so that varying degrees of combustion occur throughout the height of the furnace. The volume of the furnace now being greater, the gases remain in the furnace a relatively longer period of time, permitting more complete utilization of the oxygen in the introduced air, a higher temperature in the upper levels of the furnace, and a greater turbulence which causes the hot gases to swirl through the hood at higher velocities and thus cause all molecules repeatedly to engage or come into intimate contact with the hood or contact catalyst member. Since the hood acts as a contact catalyst, the hydrocarbon molecules crack or dissociate into a carbon black upon contacting the hood. As a result, when the hood is in its uppermost position, the carbon black produced is in the form of relatively large size particles as compared to those produced in the lower zones.

The adjustment of the hood between its extreme lower and upper positions, the other factors remaining unchanged, permits control of the type and quality of the carbon black product, it being now apparent that the particles of produced carbon will decrease in size as the position of the hood is lowered and will increase in size as the position of the hood is raised. In addition to variations in size of the carbon black particles, such adjustment of the hood also causes variations in other properties of the particles, such as density and hardness.

It will therefore be seen that the hood varies the effective volume of the furnace and thus the temperature and turbulence of the gases above the primary dissociation zone and above the thermal cracking zone.

The hood is, of course, quickly covered with carbon which acts as an insulator on all sides of the hood and prevents undue deterioration of the hood by oxidation which might otherwise occur due to the high temperatures of the gases in the contact cracking dissociation zone.

If it is desired to produce carbon black from liquid hydrocarbons, such as oil, the oil is sprayed or atomized into the furnace above the burner, after the furnace is preheated in the manner described, through the spray heads 175. The zones of combustion and dissociation will be formed in the same manner as with the gaseous hydrocarbons, the atomized oil igniting upon entering the furnace, and the quality and kind of carbon black formed being controlled by adjusting the vertical position of the hood and thus the volume of the furnace.

If desired, liquid and gaseous hydrocarbons may be introduced simultaneously into the furnace and decomposed or dissociated to form carbon black, the ratios of liquid to gaseous hydrocarbons being adjusted also to help determine the kind of carbon black to be formed.

The carbon black formed in the furnace is of course carried in suspension in the gases from the furnace to the primary cooler in the manner described.

It will now be seen that a new and improved method for producing carbon black has been illustrated and described, which comprises introducing hydrocarbons and air in predetermined ratios into a container having a restricted opening on its upper end, partially combusting or burning the hydrocarbons in a combustion zone, and causing the gases from the primary dissociation zone to intimately contact a contact catalyst in an upper dissociation zone. It will also be seen that the method includes controlling or adjusting the turbulence of the gases in the upper portion of the dissociation zone by varying the volume of the furnace or container. It will also be apparent that the method includes maintaining the temperature of the combustion zone at substantially 1800 degrees F. to 2400 degrees F., of maintaining the temperature of the lower thermal cracking portion of the dissociation zone at substantially 2200 degrees F. to 2600 degrees F., and of maintaining the temperatures of the upper contact catalytic cracking portions of the dissociation zone at substantially 2600 degrees F. to 3,000 degrees F.

It will also be apparent that a new and improved furnace for producing carbon black has been illustrated and described having a burner 100 disposed in its lower portion, gas conduit means 151 and 152 for introducing gas into the burner, air conduit means for introducing air into the furnace at the side of the burner, and a substantially conical hood or contact catalyst member vertically movable in the furnace above the burner for adjusting or controlling the volume of the furnace. It will also be apparent that adjustment of the hood will adjust the thickness and position of all the dissociation zones, namely, the primary dissociation zone immediately above the combustion zone, the thermal cracking zone, and the upper contact catalytic cracking zone; and will also control the temperature and turbulence of the gases in all dissociation zones. It will also be apparent that the hood serves as a contact catalyst to facilitate formation of carbon black in the upper portion of the dissociation zones.

It will also be seen that the new and improved burner is substantially cylindrical in form having an upper semicylindrical section 101 provided with ports and a lower imperforate section 102 of smaller radius than the upper section. It will also be apparent that the ports of the burner are flared outwardly, the radius of the flare being substantially six-tenths the thickness of the upper section 101 while the diameter of the bore is substantially eight-tenths the thickness of the upper section and the length of the inflared portion of the bore is substantially two-tenths the thickness.

It will also be apparent that a scraper bar 130 is provided for the upper section 101 of the burner which is operable from without the furnace to scrape the outer surface of the upper section to remove deposits therefrom which might clog the ports.

The foregoing description of the invention is explanatory only, and changes in the details of the construction illustrated may be made by those skilled in the art, within the scope of the appended claims, without departing from the spirit of the invention.

What is claimed and desired to be secured by Letters Patent is:

1. A method for producing carbon black including introducing hydrocarbons and air in predetermined ratios into the lower end of a container having an upper end provided with a restricted opening, partly combusting the hydrocarbons in a combustion zone in the container, drawing the gases from the combustion zone into a dissociation zone to engage intimately with a volume control, and controlling the temperature and turbulence of the gases in the dissociation zone to vary the type of carbon black produced by varying the volume of the dissociation zone by adjusting the volume control disposed in the container above the dissociation zone.

2. A method for producing carbon black including introducing hydrocarbons and air in predetermined ratios into the lower end of a container having an upper end provided with a restricted opening, partly combusting the hydrocarbons in a combustion zone in the container at temperatures within a range of substantially 1800 degrees F. to 2400 degrees F., drawing the gases from the combustion zone into a dissociation zone to engage intimately with a volume control, maintaining the gases in the lower portion of the dissociation zone at temperatures substantially within a range of 2200 degrees F., to 2600 degrees F. and in the upper portion of the dissociation zone within a range of 2600 degrees F. to 3000 degrees F., and controlling the temperature and turbulence of the gases in the dissociation zone to vary the type of carbon black produced by varying the volume of the dissociation zone by adjusting a volume control disposed in the container above the dissociation zone.

3. A method for producing carbon black including introducing hydrocarbons and air in predetermined ratios into the lower end of a container having an upper end provided with a restricted opening, partly combusting the hydrocarbons in a combustion zone in the container, drawing the gases from the combustion zone into a dissociation zone to engage intimately with a volume control, controlling the temperature and turbulence of the gases in the dissociation zone to vary the type of carbon black produced by varying the volume of the dissociation zone by varying the position of the volume control disposed in the container above the dissociation zone, and drawing the gases from the dissociation zone from the container through the opening in the upper end thereof.

4. A method for producing carbon black including introducing hydrocarbons and air in predetermined ratios into the lower end of a container having an upper end provided with a restricted opening, partly combusting the hydrocarbons in a combustion zone in the container at temperatures within a range of substantially 1800 degrees F. to 2400 degrees F., drawing the gases from the combustion zone into a dissociation zone to engage intimately with a volume control, maintaining the gases in the lower portion of the dissociation zone at temperatures substantially within a range of 2200 degrees F. to 2600 degrees F. and in the upper portion of the dissociation zone within a range of 2600 degrees F. to 3000 degrees F., controlling the temperature and turbulence of the gases in the dissociation zone to vary the type of carbon black produced by varying the volume of the dissociation zone by varying a volume control disposed in the container above the dissociation zone, and drawing the gases from the dissociation zone from the container through the opening in the upper end thereof.

5. In a furnace having a vertically adjustable hood within the upper portion of the furnace, a substantially cylindrical burner disposed below said hood and located in the bottom portion of said furnace having an upper semi-cylindrical section provided with a plurality of ports spaced over substantially the whole surface of the upper section, a lower imperforate semi-cylindrical section, said lower section having a smaller radius of curvature than said upper section, and means for introducing gas into the lower section of the burner.

6. In a furnace having a vertically adjustable hood within the upper portion of the furnace, a substantially cylindrical burner disposed below the hood in the bottom portion of the furnace having an upper semi-cylindrical section provided with a plurality of ports spaced over substantially the whole surface of the upper section, a lower imperforate semi-cylindrical section, said lower section having a smaller radius of curvature than said upper section, and means for introducing gas into the lower section of the burner, said ports having a straight bore portion and an outwardly flared portion.

7. In a furnace having a vertically adjustable hood within the upper portion of the furnace, a substantially cylindrical burner disposed below the hood within the bottom portion of the furnace having an upper semi-cylindrical section provided with a plurality of ports spaced over substantially the whole surface of the upper section, a lower imperforate semi-cylindrical section, said lower section having a smaller radius of curvature than said upper section, and means for introducing gas into the lower section of the burner, said ports having a straight bore portion and an outwardly flared portion, the radius of flare of said flared portion being substantially six-tenths the thickness of said upper section, the diameter of said bore portion being substantially eight-tenths the thickness of said upper section, and the length of said bore portion being substantially two-tenths the thickness of said upper section.

8. In a furnace having a volume control within the upper portion of the furnace for adjusting the volume of the furnace, a substantially cylindrical burner disposed below said volume control in the bottom portion of the furnace having an upper semi-cylindrical section provided with a plurality of ports spaced over substantially the whole surface of the upper section, a lower imperforate semi-cylindrical section, said section having a smaller radius of curvature than said upper section, and means for introducing gas into the lower section of the burner.

9. In a furnace having a volume control within the upper portion of the furnace for adjusting the volume of the furnace, a substantially cylindrical burner disposed below said volume control in the bottom portion of the furnace having an upper semi-cylindrical section provided with a plurality of ports spaced over substantially the whole surface of the upper section, a lower imperforate semi-cylindrical section, said section having a smaller radius of curvature than said upper section, and means for introducing gas into the lower section of the burner, said ports having the straight bore portion and an outwardly flared portion.

References Cited in the file of this patent

UNITED STATES PATENTS

| | | |
|---|---|---|
| Re. 16,765 | Matlock | Oct. 11, 1927 |
| 560,458 | Adler | May 19, 1896 |
| 1,890,188 | Morrell et al. | Dec. 6, 1932 |
| 2,353,505 | Scheineman | July 11, 1944 |
| 2,418,475 | Loving | Apr. 8, 1947 |
| 2,779,665 | Heller | Jan. 29, 1957 |
| 2,813,009 | Ekholm et al. | Nov. 12, 1957 |